(12) United States Patent
Jiao

(10) Patent No.: US 7,376,827 B1
(45) Date of Patent: May 20, 2008

(54) DIRECTORY-ENABLED NETWORK ELEMENTS

(75) Inventor: Fan Jiao, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/435,015

(22) Filed: Nov. 5, 1999

(51) Int. Cl.
H04L 29/08 (2006.01)
H04L 29/00 (2006.01)
H04L 29/06 (2006.01)
H04L 29/10 (2006.01)

(52) U.S. Cl. .................. 713/153; 713/150; 713/151; 713/152; 709/225; 709/226; 709/238; 709/239; 709/244; 370/351

(58) Field of Classification Search ............ 713/201, 713/200
See application file for complete search history.

(56) References Cited

U.S. PATENT DOCUMENTS

| | | | | |
|---|---|---|---|---|
| 4,897,874 A | * | 1/1990 | Lidinsky et al. ............ 713/201 |
| 5,826,014 A | * | 10/1998 | Coley et al. ............... 713/201 |
| 5,943,417 A | * | 8/1999 | Cox et al. ............... 379/266.02 |
| 5,944,824 A | * | 8/1999 | He ............................. 713/201 |
| 5,968,116 A | * | 10/1999 | Day et al. .................. 709/202 |
| 5,968,176 A | * | 10/1999 | Nessett et al. ............. 713/201 |
| 6,061,798 A | * | 5/2000 | Coley et al. ............... 713/201 |
| 6,131,120 A | * | 10/2000 | Reid .......................... 709/225 |
| 6,157,636 A | * | 12/2000 | Voit et al. .................. 370/353 |
| 6,157,942 A | * | 12/2000 | Chu et al. .................. 709/203 |
| 6,192,362 B1 | * | 2/2001 | Schneck et al. ............. 707/10 |
| 6,233,616 B1 | * | 5/2001 | Reid .......................... 709/225 |
| 6,275,942 B1 | * | 8/2001 | Bernhard et al. .......... 713/201 |
| 6,330,560 B1 | * | 12/2001 | Harrison et al. .............. 707/8 |
| 6,345,266 B1 | * | 2/2002 | Ganguly et al. .............. 707/1 |
| 6,363,411 B1 | * | 3/2002 | Dugan et al. ............... 709/202 |
| 6,396,920 B1 | * | 5/2002 | Cox et al. ............... 379/266.02 |
| 6,400,707 B1 | * | 6/2002 | Baum et al. ................ 370/352 |
| 6,430,596 B1 | * | 8/2002 | Day, II ...................... 709/202 |
| 6,463,470 B1 | | 10/2002 | Mohaban et al. |
| 6,470,357 B1 | * | 10/2002 | Garcia et al. ............... 707/200 |
| 6,490,589 B1 | * | 12/2002 | Weider et al. .............. 707/100 |
| 6,498,612 B1 | * | 12/2002 | Brown et al. ............... 715/762 |
| 6,499,110 B1 | * | 12/2002 | Moses et al. ............... 713/201 |
| 6,539,425 B1 | * | 3/2003 | Stevens et al. ............. 709/220 |

(Continued)

OTHER PUBLICATIONS http://delivery.acm.org/10.1145/100000/99533/p50-comer.pdf?key1=99533&key2=1549561711&coll=ACM&dl=ACM&CFID=70438345&CFTOKEN=16255192.*

(Continued)

Primary Examiner—Syed A. Zia
(74) Attorney, Agent, or Firm—Hickman Palermo Truong & Becker LLP

(57) ABSTRACT

A directory enabled network element, which in one embodiment, is a network device that has an element that enables querying, accessing, and updating directory information that is managed by a directory service of a network. An application programming interface (API) is configured to receive directory services requests from application programs (APs) and provide the directory services requests to the directory enabling element. A locator service is accessible using the API and configured to locate servers that provide the directory services. A bind service in the directory enabling element is coupled to a security protocol. An event service is configured to receive registration of an event and an associated action from an AP, notify the AP when the event occurs, and execute the associated responsive action. The network device can thereby automatically authenticate itself to a directory service.

14 Claims, 9 Drawing Sheets

U.S. PATENT DOCUMENTS

| | | |
|---|---|---|
| 6,581,093 B1 | 6/2003 | Verma |
| 6,628,772 B1 * | 9/2003 | McGrath et al. ....... 379/218.01 |
| 6,629,144 B1 * | 9/2003 | Chu et al. ................... 709/227 |
| 6,650,644 B1 * | 11/2003 | Colley et al. .......... 370/395.21 |
| 6,680,942 B2 * | 1/2004 | Mead et al. ................ 370/392 |
| 6,754,181 B1 * | 6/2004 | Elliott et al. ................ 370/252 |
| 6,769,000 B1 * | 7/2004 | Akhtar et al. ........... 707/103 R |
| 7,165,174 B1 * | 1/2007 | Ginter et al. ............... 713/153 |
| 2001/0042059 A1 | 11/2001 | Uehara et al. |
| 2002/0046260 A1 * | 4/2002 | Day, II ....................... 709/219 |
| 2003/0091028 A1 * | 5/2003 | Chang et al. ............... 370/352 |

OTHER PUBLICATIONS

Ericsson, "Understanding Telecommunications," Part A, Chapter 8 (A.8.3), last published Apr. 22, 2005 retrieved from <http://www.ericsson.com/support/telecom/part-a/a-8-3.shtml> on Jul. 20, 2005, 8 pages.

* cited by examiner

DIRECTORY-ENABLED NETWORK ELEMENTS

FIELD OF THE INVENTION

The present invention relates to a method and apparatus for enabling a network element to connect to a directory service of a data communications network, authenticate itself to the directory service, and provide directory-enabled intelligent network services.

BACKGROUND OF THE INVENTION

—Computer Networks

A computer network typically comprises a plurality of interconnected entities ("network elements") that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork known as the Internet.

Each network entity preferably includes network communication software, which may operate in accordance with Transport Control Protocol/Internet Protocol (TCP/IP) or some other suitable protocol. A protocol generally consists of a set of rules defining how entities interact with each other. In particular, TCP/IP defines a series of communication layers, including a transport layer and a network layer. At the transport layer, TCP/IP includes both the User Data Protocol (UDP), which is a connectionless transport protocol, and TCP which is a reliable, connection-oriented transport protocol. When a process at one network entity (source) wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are re-assembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports (i.e., logical network interfaces ("LI" or "interfaces")) that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which, in TCP/IP networks, corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

—Network Element Intelligence

A significant drawback of current network technology is that routers primarily store the information needed to set other network elements as needed to carry out network services ("provisioning"). Workstations or PCs that carry out network management functions typically have information useful in determining how to interconnect network elements ("configuration"), and network service policies, but do not have the knowledge of how to carry out these higher level policies onto a specific router with a given NOS. Further, such devices normally do not have a means to deliver such policies onto a router in such a way that router understands exactly how to integrate the policies into its internal software structure in order to provision the required network services for that network element.

A related drawback is that provisioning is typically carried out using a complicated, arcane, command-line interface (CLI) that is supported by routers. A technician enters one or more CLI commands into a router or other device using a terminal interface. This is called manual CLI provisioning.

Second generation network elements often support Simple Network Management Protocol (SNMP) and can be provisioned using SNMP messages and Management Information Base (MIB) variable values. However, many thousands of non-SNMP devices are currently used in existing networks. For these devices, there is no adequate way to carry out provisioning changes, and in particular, there is no way to carry out provisioning changes in a secure way because the CLI typically receives a non-encrypted user name and password ("cleartext"). Further, some large enterprises do not believe that SNMP version 1 is secure enough for use in mission-critical networks. SNMP version 2 included better security provisions, but never became a standard. SNMP version 3 also includes better security provisions, but is recently proposed and not currently a standard.

—Directory Services

Directory services, separate from network elements, are now used in networks. A network element may contact a directory server that forms part of a directory service, using an agreed-upon protocol, to locate other network elements, clients and servers in a network. Directory services are described generally in publications, including, for example, R. Orfali et al., "Client-Server Survival Guide" (New York: John Wiley & Sons, 3d ed., 1999), at pp. 131–139.

The first generation of directory services, such as Novell Directory Service (NDS), conformed to the ITU X.500 standard and provided access to static information. Rapid network growth has created the need for more robust, scalable and secure directory services. Second generation directory services, such as Microsoft Active Directory, Netscape Directory, and others that conform to Lightweight Directory Access Protocol (LDAP), offer more powerful information and a schema that models the entire network. LDAP is defined in public documents such as RFC 1777, RFC 1823, and RFC 2251 through RFC 2256, inclusive. Microsoft Active Directory is under development and not yet commercially released. It is an anticipated component of Microsoft Windows 2000. Netscape Directory has been the predominant directory server for UNIX platforms. NDS has recently improved its compliance with standards, as well as its security services, which use Public Key Infrastructure (PKI). Kerberos and PKI are the most significant standards-based, industry-backed security technologies available today.

Active Directory uses Kerberos credentials to accomplish authentication of users and processes. Using Active Directory, a network element can authenticate itself to the directory before the network element can communicate with the directory. This ensures that only recognized network elements can obtain sensitive directory information, thereby helping to protect the network against unauthorized use or attack. Further, an authenticated network element is logged into the directory as a trusted client, and can do more than a non-trusted or non-authenticated client. For example, a trusted client can access policies in the directory; associate policies with devices; and apply more sophisticated configuration information.

On the other hand, PKI (public key infrastructure) enables users of unsecured public networks such as the Internet to securely and privately exchange data and monetary value through the use of a public and a private cryptographic key pair that is obtained and shared through a trusted authority. The public key infrastructure provides for digital certificates that can identify individuals or organizations and directory services that can store and, when necessary, revoke them. Although the components of a PKI are generally understood, a number of different vendor approaches and services are emerging. Meanwhile, an Internet standard for PKI is under consideration.

The public key infrastructure assumes the use of public key cryptography, which is the most common method on the Internet for authenticating a message sender or encrypting and decrypting a message. Traditional cryptography has usually involved the creation and sharing of a secret key for the encryption and decryption of messages. This secret or private key system has the significant flaw that if the key is discovered or intercepted by someone else, messages can easily be decrypted. For this reason, a combination of public key cryptography and the public key infrastructure is the preferred approach on the Internet.

A public key infrastructure consists of:

—A certificate authority (CA) that issues and verifies digital certificates. A certificate includes the public key or information about the public key.

—A registration authority (RA) that acts as the verifier for the certificate authority before a digital certificate is issued to a requester.

—One or more directories where the certificates (with their public keys) are held (usually in an ITU X.500 standard directory).

—A certificate management system.

However, in current approaches, routers, switches, gateways, load balancers, and other elements of a conventional packet-switched network cannot automatically authenticate themselves to the directory. A separate service is required to facilitate such authentication. Thus, there is a need to provide a way for a router or other network element to authenticate itself to the directory automatically, for example, when the network element is powered up.

There is also a specific need for a way to carry out authentication of a router or other network element to the directory using Kerberos credentials rather than CLI passwords that are communicated in cleartext.

The widely distributed nature of directory services is extremely useful for geographically and logically distributing policies and configurations. A drawback of this approach, however, is that there is no inherent mechanism whereby a router or other network element can locate the nearest directory server. There is a need for a location service with which a network element can find the nearest directory server.

Another drawback of current directory services is that they lack an event notification mechanism, unlike typical database servers that do have event services. There is a need for a standalone event notification service for signaling network elements for some network services such as provisioning requests.

More broadly, there is a need in this field for an improved method or mechanism that enables network elements such as routers, switches, gateways and hubs to query, access, and update data of a second generation directory service in a secured fashion.

There is a particular need for a system that can use the IETF Policy Framework to model various policies of network services, describing the behavior of both hardware and software elements in network elements in the network and their relationships in a set of Directory Schema, and sending out provisioning requests from users to network element through event notification. There is also a need for Directory-enabled software components in a network element (Agents) that can obtain provision policy data from the Directory by event notification, interrupt the policy data, and apply the policy internally within the NOS to change the behavior of a network element.

There is also a need for a network management application that understands the semantics of network elements and that can provision network elements by directly sending configuration commands into the network elements through use of event notification.

SUMMARY OF THE INVENTION

The foregoing needs and objects, and other needs and objects that will become apparent from the following description, are achieved by the present invention, which comprises, in one aspect, a directory-enabled network element. In one embodiment, a router, switch, or other network device has a directory enabling element that is configured to query, access, and update directory information that is managed by a directory service of a network that includes the network element. An application programming interface is configured to receive directory services requests from application programs and provide the directory services requests to the directory enabling element. A locator service is accessible using the application programming interface and configured to locate servers that provide the directory services in the network. A bind service in the directory enabling element is coupled to a security protocol and configured to bind an external application program to the security protocol. An event service is configured to receive registration of an event and an associated responsive action from an application program, notify the application program when the event occurs, and execute the associated responsive action in response thereto. As a result, a router, switch, or other network device can automatically authenticate itself to a directory service and query, access and update information in any directory server of a distributed network.

In another aspect, a directory-enabled network element comprises Security services, Location services, Event notification services, a Provision schema, and Directory-enabled software components ("Agents"). Each Agent communicates using LDAP, obtains policy data from the Directory when the Agent is awakened by the Event notification services, and interrupts and applies policy data into internal data structures of an NOS in a network element.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1A:
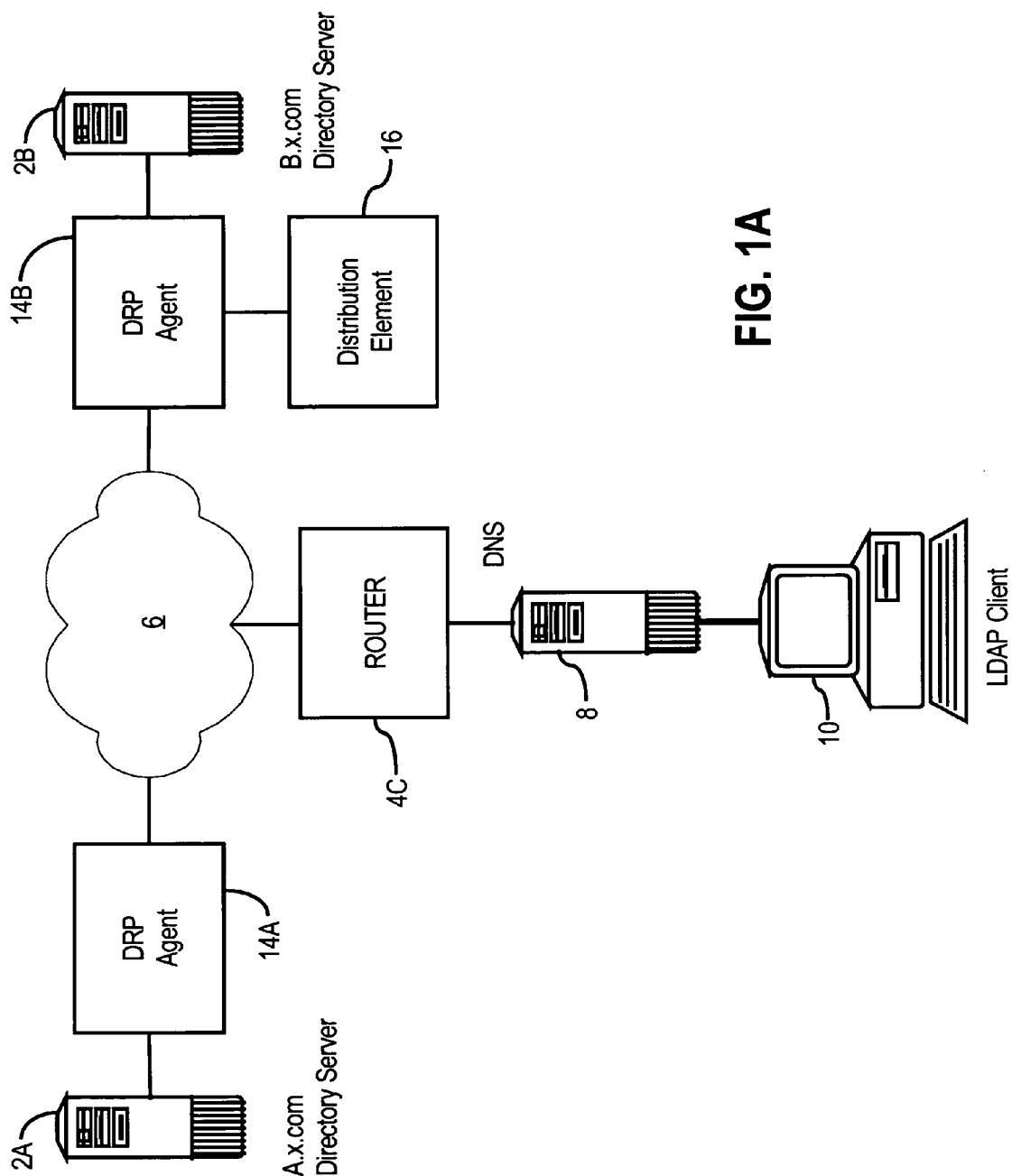
FIG. 1A is a block diagram of a locator service as implemented by Active Directory.

A directory-enabled network element and methods of using it are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

General Overview

An apparatus and method are disclosed for enabling a network element to query, access, and update data of a directory service. Generally, embodiments provide directory-enabled network elements that enable smart, user-friendly network elements that can be managed using network services. In particular, well-defined network services offered by the network elements are easily associated with users. In one embodiment, the operating system of a network element has one or more Directory Service Agents. A router or other network element authenticates itself to the directory service automatically when it is powered up. Thereafter, the Directory Service Agents provide network services on behalf of the network services directly to authorized users.

In a preferred embodiment, a client software component resides on a router or other network element and executes as an application that is supervised by and under the control of a network operating system (NOS) of the network element. An example of a suitable NOS is Internetworking Operating System (IOS) commercially available from Cisco Systems, Inc., San Jose, Calif. Preferably, the client software component can query and access data that resides in a Directory Server using Lightweight Directory Access Protocol (LDAP) version 3.

Using the preferred mechanism, other applications running under control of the NOS may query, access and update directory data through use of the Directory Schema. Examples of applications include: network management applications; QoS management applications; DHCP; DNS; Policy Servers; security services (e.g., IPSEC, security authentication, certification administration); H323 applications (e.g., Call Dial plan); naming services and trader services of CORBA; cable modems; APPN resource registration; and MAC address caching.

Functional Overview

A preferred embodiment has the following functional characteristics.

1. LDAP VERSION 3 SUPPORT. A preferred embodiment communicates and implements the functions of LDAP, version 3. In particular, embodiments can process all protocol elements of LDAP, version 2, as described in RFC 1777. Further, embodiments support a referral capability whereby one directory server can forward a query of a client to another directory server.

LDAP version 3 also provides a schema discovery mechanism. An LDAP client can determine the structure of the information in a directory. Information about directory structure is needed to enable a client to search, read, and update server information. LDAP version 3 also supports paged information delivery. Normally a server returns all entries resulting from a directory search to the client, and the client has no ability to regulate the flow of inbound information. With paged information delivery, search results arrive one page at a time. LDAP version 3 is defined by RFC 2501, RFC 2502, RFC 2503, and its C language API, entitled draft-ietf-ldapext-ldap-c-api-04.txt.

2. LOCATOR SERVICE. The preferred embodiment provides a directory locator service. Active Directory provides multi-master replication using mirror directory servers for fault tolerance, scalability and geographic distribution. Accordingly, a mechanism is needed to enable a directory client to locate the closest directory server in the network. In one approach, a round-robin method is used to distribute load among the geographically distributed directory servers.

However, this approach is not always scalable and does not guarantee that end users will experience an acceptable level of service. Currently there is no standard defined for Locator services. The two leading proposed standards are RFC 2608 Service Location Protocol version 2, and draft-armijo-ldap-locate-00. Cisco's Distributed Director can also be used to locate a given service.

FIG. 1A is a block diagram of an implementation of a locator service. Directory servers 2A, 2B are coupled through routers 4A, 4B, respectively, to internetwork 6. The domain names of directory servers 2A, 2B, are "A.x.com" and "B.x.com," respectively. A DNS server 8 is coupled via router 4C to internetwork 6. LDAP client 10 can communicate with DNS server 8 and with internetwork 6. Directory server 2A is coupled by Director Response Protocol (DRP) Agent 14A to internetwork 6 and directory server 2B is coupled by DRP Agent 14B to the network. Further, a distribution direction element 16 is coupled to one of the DRP Agents, for example, DRP Agent 14B.

Distribution direction element 16 is a combination of hardware and software elements, based on a router, that efficiently distribute Internet services among globally dispersed Internet server sites based on intelligence built into the Internet router-based infrastructure, standard Domain Name Services (DNS), and the Hypertext Transfer Protocol (HTTP). In one embodiment, distribution direction element 16 is the DistributedDirector product that is commercially available from Cisco Systems, Inc. The distribution direction element 16 serves as the primary DNS for the directory servers 2A, 2B. Records identifying the directory servers 2A, 2B are added to the distribution direction element's database.

Accordingly, when LDAP client 10 looks up the directory servers in DNS server 8, they are not found. In response, DNS server 8 refers to distribution direction element 16 as an authoritative name server. The DNS server 8 queries the distribution direction element 16 by forwarding the service lookup, which the distribution direction element 16 accepts. In response, distribution direction element 16 identifies which directory servers are in the network based on its routing tables, and determines measures round-trip packet delay time between LDAP client 10 and directory servers 2A, 2B. Based on the time values that are measured, distribution direction element 16 can select the closest or best server for the LDAP client. The distribution direction element 16 then returns a single IP address corresponding to the best server. The DNS server 8 forwards the IP address as a result value to the LDAP client 10.

Figure 1B:
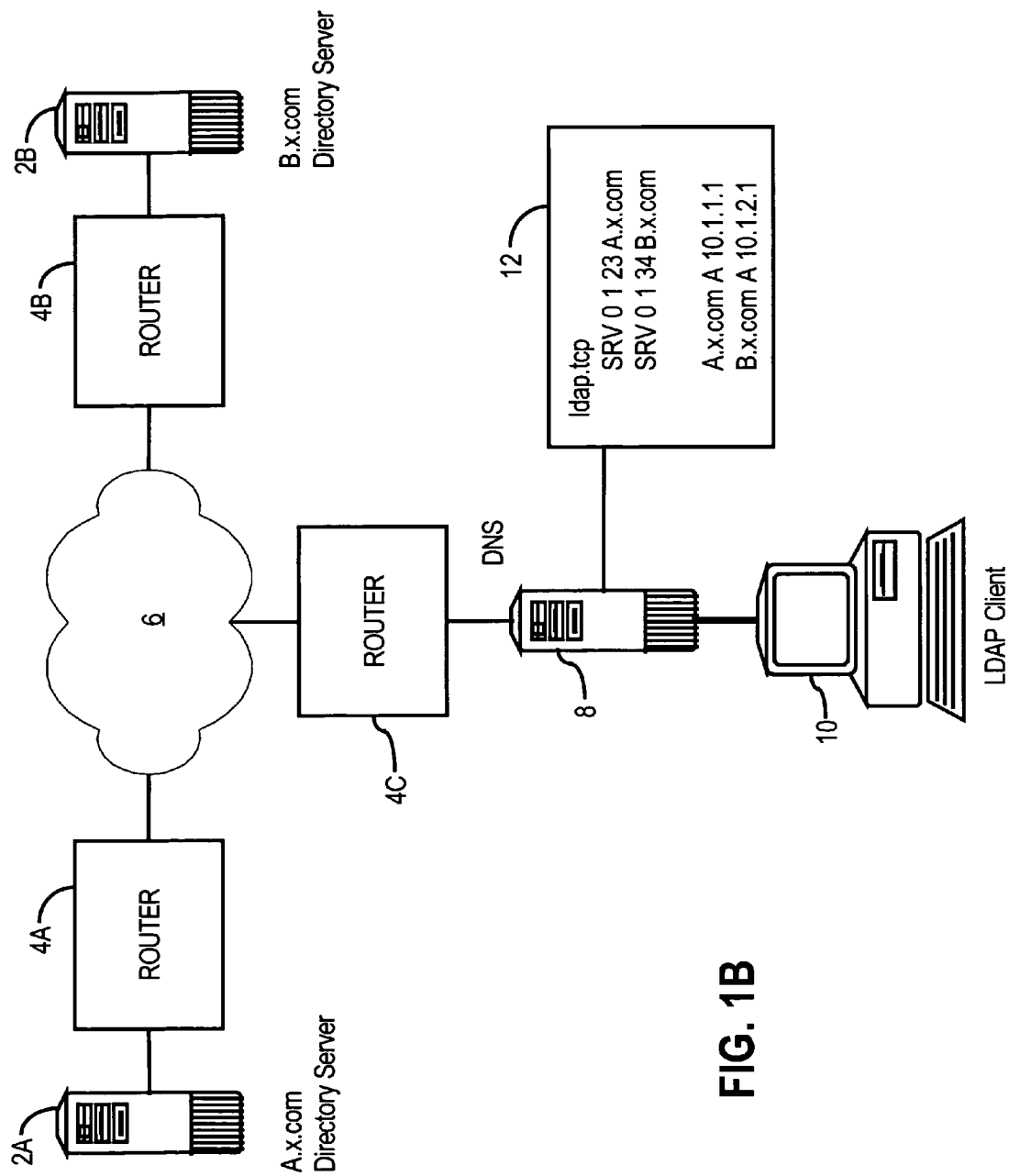
FIG. 1B is a block diagram of an alternate implementation of a locator service.

FIG. 1B is a block diagram of a generic locator service as implemented in accordance with the document "draft-armjio-ldap-locatoe-00". Directory servers 2A, 2B are coupled through routers 4A, 4B, respectively, to internetwork 6. The domain names of directory servers 2A, 2B, are "A.x.com" and "B.x.com," respectively. A DNS server 8 is coupled via router 4C to internetwork 6. LDAP client 10 can communicate with DNS server 8 and with internetwork 6.

In operation, the Directory dynamically adds server records and DNS resolution records to DNS server 8, as indicated by box 12. Preferably the records are DNS SRV records of the type defined in RFC 2052, "A DNS RR for specifying the location of services (DNS SRV)." As a result, DNS server 8 knows the name and location of directory servers 2A, 2B.

Thereafter, LDAP client 10 asks the Directory for a specific service that is defined in RFC 2052, rather than providing the name or IP address of a particular directory server. The Directory responds by providing a list of names of all available servers that have the requested service, e.g., directory servers 2A, 2B. LDAP client 10 connects to one of the directory servers and obtains site information about the client itself, site information for that server, and capability information for that server. Based on the site information of all the servers, the client can determine the closest server. The client then performs a DNS lookup using DNS server 8 to obtain an IP address of the closest server, and connects to it.

Advantageously, in the configuration of FIG. 1A, the LDAP client is not required to select a server from a list of possible servers. Further, administrative costs associated with defining site information, as in FIG. 1B, are eliminated. Use of routing table information and round-trip delay time measurement is more accurate and dynamic than the approach of FIG. 1B.

3. EVENT SERVICES. The preferred embodiment provides event services. A device can publish an event. The event is stored in the directory, managed by a directory-aware event server. When events occur, the event server notifies all affected devices in cooperation with the directory. Event Services is a publish and subscribe system that allows network elements to produce or consume events to integrate with application processes. This capability promotes flow-through functionality, which is essential for rapid provisioning of self-service applications. Producers and consumers are both clients to the event server. Producers create events and send to the event server. The event server notifies the consumers registered to read these events by sending an UDP tickle. In this case, the tickle is the event that notifies the consumers. The consumer fetches the event data from the event server and takes appropriate actions.

Figure 2A:
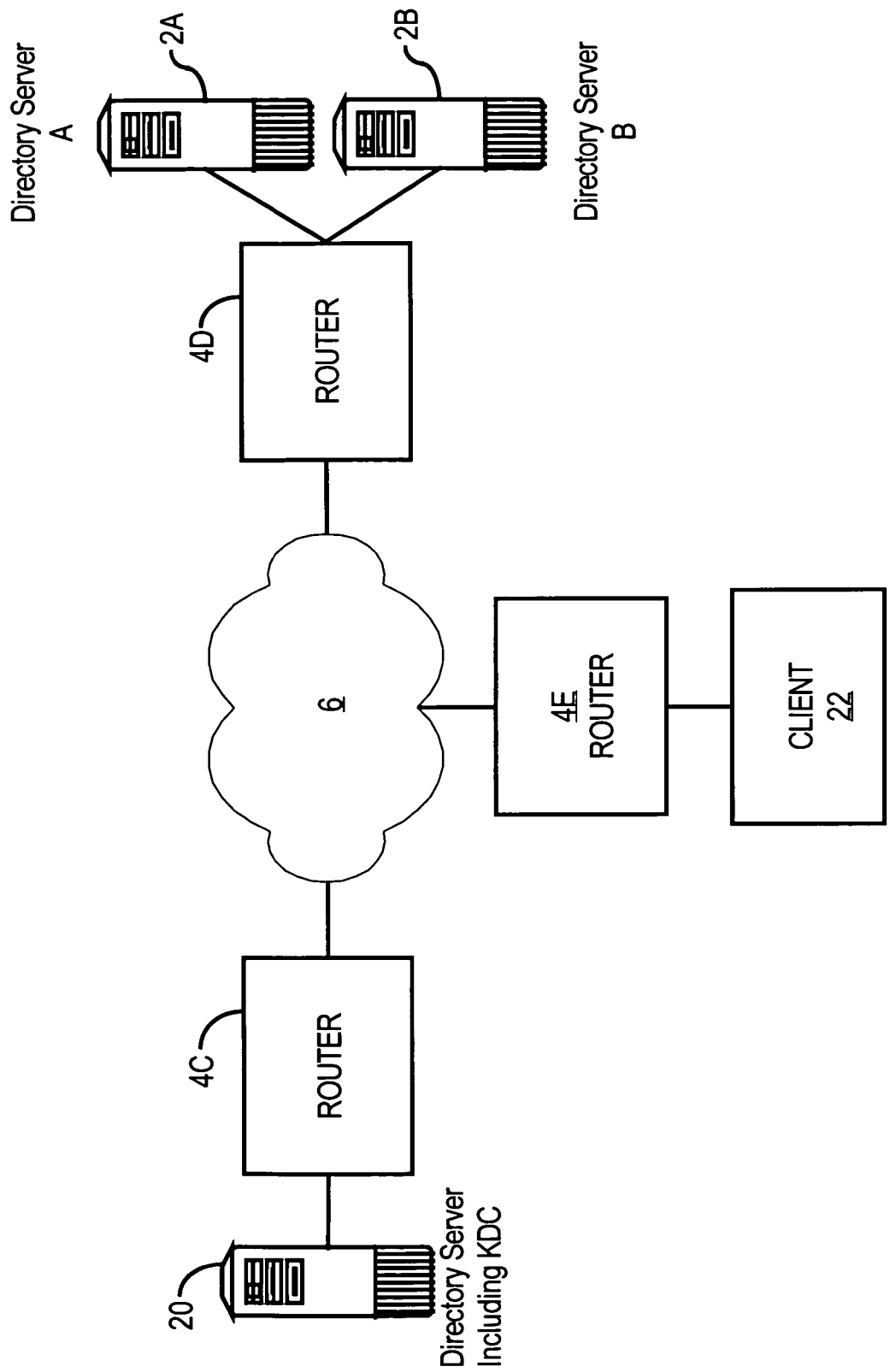
FIG. 2A is a block diagram of a network that includes a Kerberos security system.

4. SECURITY SERVICE. Security is important for controlling access to directory servers 2A, 2B, and others. LDAP, version 3 provides simple authentication using a cleartext password as well as any Simple Authentication and Security Layer (SASL) mechanism. However, use of cleartext passwords is discouraged because it cannot guarantee confidentiality. Accordingly, in a preferred embodiment, Kerberos version 5 is a preferred authentication security protocol. Kerberos version 5 is described in RFC 1510, "The Kerberos Network Authentication Service (V5)." X.500 Public Key Infrastructure is also a preferred authentication security protocol. FIG. 2A is a block diagram of a network that includes a Kerberos security system. A client 22, which is any client application of the NOS, is coupled to network 6 through router 4E. Alternatively, client 22 is coupled directly to network 6. Directory servers 2A, 2B are coupled by router 4D to the network. A directory server having a Key Distribution Center (KDC) 20 is coupled by router 4C or other means to network 6.

In this configuration, when client 22 starts operation, it obtains a Kerberos ticket-granting ticket (TGT) and a session key from KDC 20, and stores this information in memory. Thereafter, when an LDAP application needs to access directory server 2A, client 22 sends the TGT to KDC 20 and requests a ticket for directory server 2A. KDC 20 sends back a ticket for A. In response, client 22 sends a request to directory server 2A that includes the ticket. Directory server 2A decrypts the ticket and then discovers client 22 in the network. The LDAP application can now communicate with directory server 2A.

When a second LDAP application needs to access directory server 2A, the client 22 can re-use the first ticket for directory server 2A. If the second LDAP application needs to access directory server 2B, client 22 must obtain a ticket for directory server 2B from KDC 20.

Structural Overview

Figure 2B:
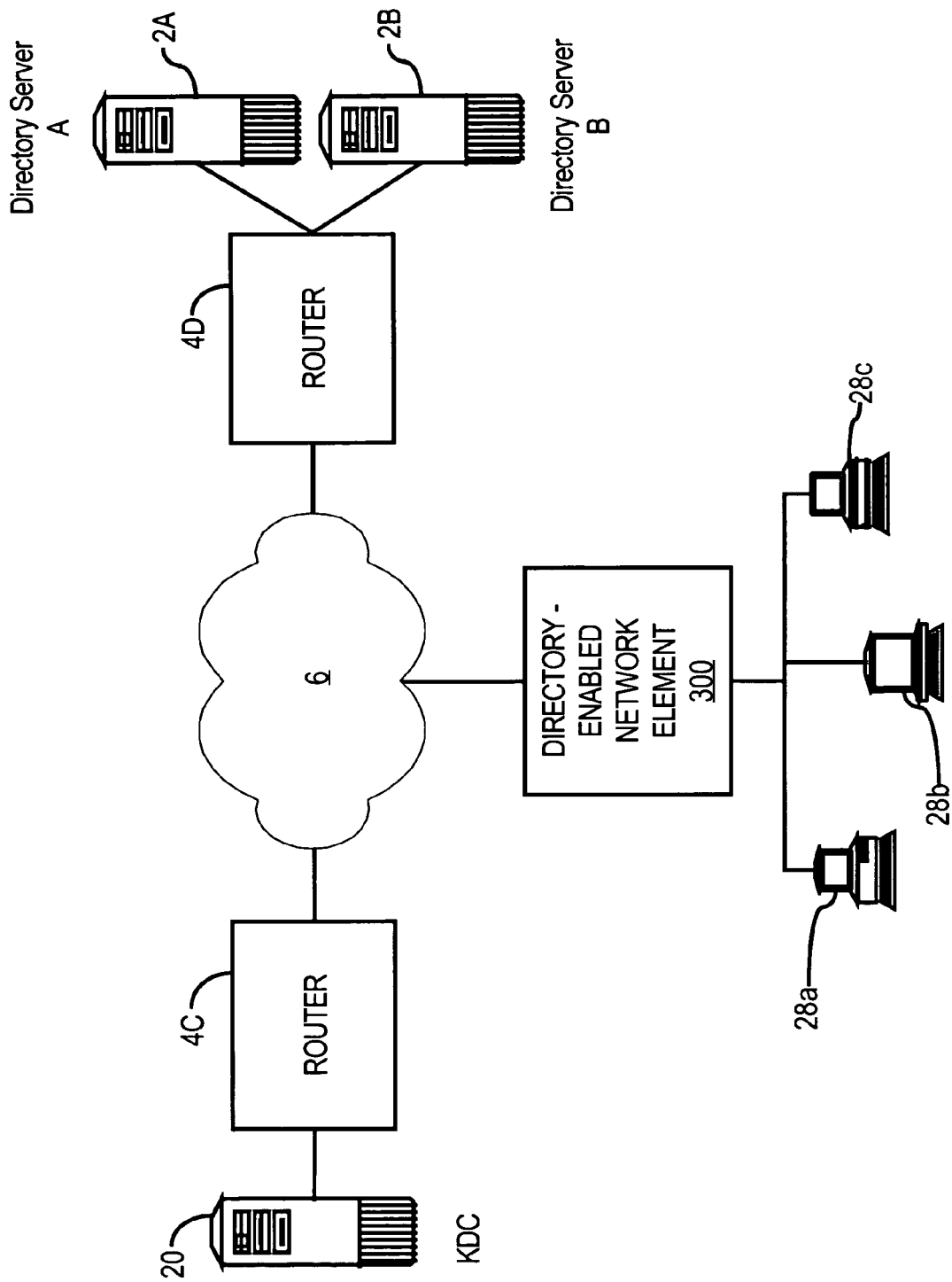
FIG. 2B is a block diagram of a network that includes a directory-enabled network element.

FIG. 2B is a block diagram of a network that includes a directory-enabled network element 300, which is coupled to network 6. A plurality of clients 28a, 28b, 28c are coupled to directory-enabled network element 300. Clients 28a, 28b, 28c may be personal computers, work stations, or other network end stations. One or more of KDC 20, directory server 2A, or directory server 2B may be a client, non-directory server, or other end station.

Figure 3A:
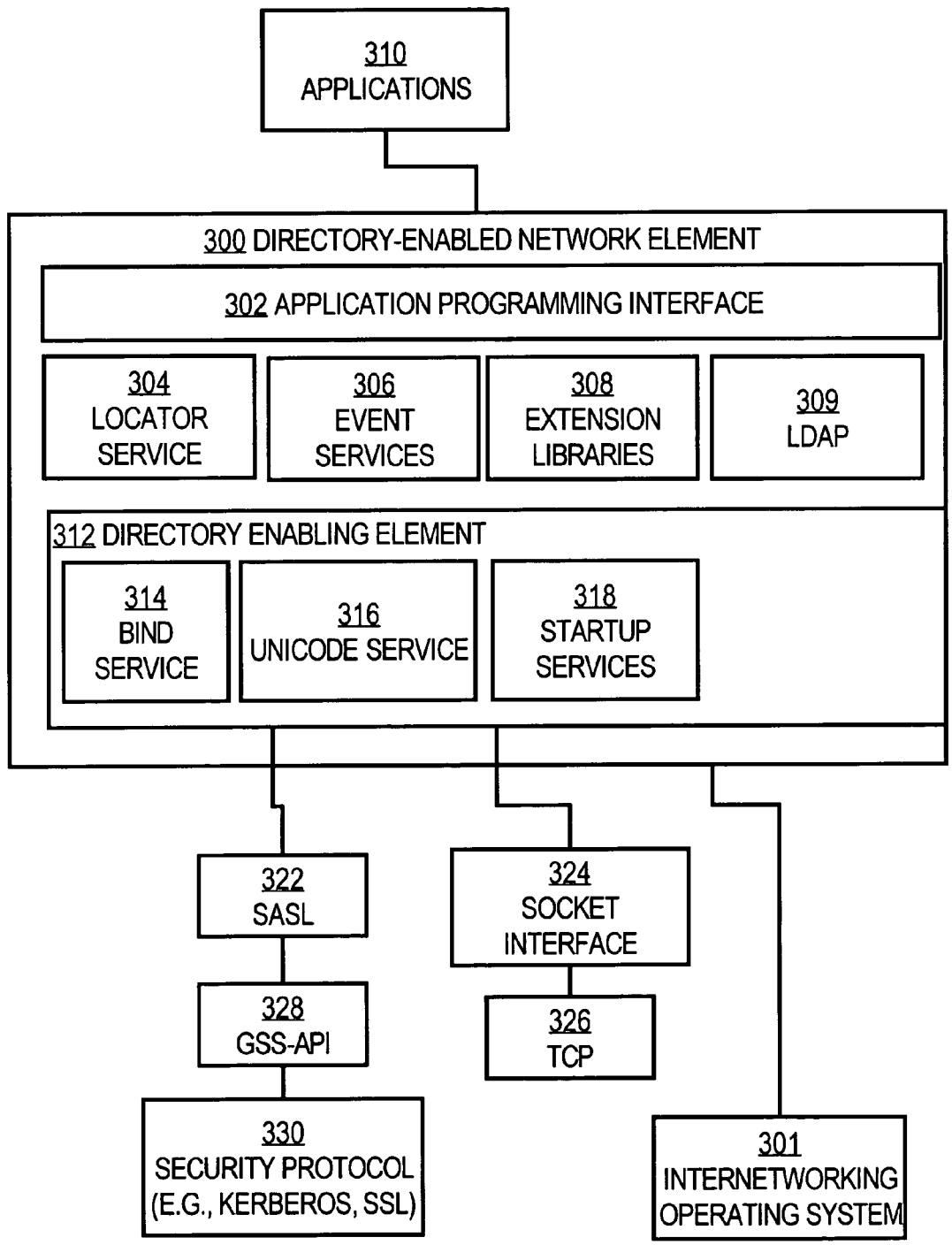
FIG. 3A is a block diagram of a directory-enabled network element and associated elements with which it may be used.

FIG. 3A is a block diagram of an exemplary embodiment of a directory-enabled network element 300 and supporting elements with which it may be used.

Generally, directory-enabled network element 300 comprises a plurality of associated software elements that may be executed by a hardware internetworking element such as a router, switch, gateway, load balancer, etc. Alternatively, directory-enabled network element 300 comprises a plurality of associated software elements that may be executed by an end station such as a workstation, printer, server, personal computer, etc.

The associated software elements operate under control of an internetworking operating system 301. Thus, directory-enabled network element 300 acts as a client of the operating system 301. Applications 310 communicate with directory-enabled network element 300 to obtain directory services from it. Applications 310 may also run under control of operating system 301, and thus, applications 310 may act as clients of both directory-enabled network element 300 and operating system 301. Directory-enabled network element 300 does not provide a user interface and hence, applications 310 are developed to obtain services from the directory-enabled network element through calls to it.

In an embodiment, directory-enabled network element 300 comprises an application program interface 302, locator service 304, and directory enabling element 312. Optionally, in a preferred embodiment, directory-enabled network element 300 may also include event services 306, extension libraries 308, and LDAP element 309.

In the preferred embodiment, directory enabling element 312 is a plurality of software elements that collectively implement functions defined in LDAP, preferably version 3. LDAP is an Internet standard defined in RFC 2251 by the Internet Engineering Task Force that provides a common means to access directory services by diverse clients. LDAP uses Transmission Control Protocol (TCP) as an underlying transport mechanism and it can use the IOS socket interface. Application programs that conform to the LDAP standard can interoperate with other compliant applications. A directory-enabled network device as disclosed herein can interoperate with any other element that uses LDAP. In one preferred embodiment, directory enabling element 312 is implemented using LDAP version 3 source code obtained from Microsoft Corporation. Other implementations of LDAP version 3 such as reference implementations may be used.

Directory enabling element 312 communicates with SASL 322, GSS-API 328, and Security Protocol 330 to provide security for controlling access to directory servers. SASL 322 provides a security interface between LDAP version 3, as implemented by directory enabling element 312, and GSS-API 328. SASL 322 is an implementation of the technology defined in RFC 2222, "Simple Authentication and Security Layer (SASL)." GSS-API 328 in turn interfaces SASL 322 to Security Protocol 330, which may comprise, for example, an implementation of Kerberos version 5, SSL, etc. GSS-API 328 is an implementation of the technology described in RFC 1508, "Generic Security Service Application Program Interface." Any suitable security interface or security mechanism may substitute for the combination of SASL 322, GSS-API 328, and Security Protocol 330, including later-developed security mechanisms. What is important is that directory enabling element 312 can receive information from applications 310 or other sources with an acceptable level of security.

Application program interface 302 provides an interface by which applications 310 may access functions of directory enabling element 312. When operating system 301 comprises Cisco IOS, normally the application program interface 302 provides an interface to all functions of LDAP, which are implemented in LDAP element 309. If other operating system platforms are used, or for low-end devices that have memory constraints, then a subset of the LDAP functions may be implemented. In the preferred embodiment, application program interface 302 provides all the functions that are defined in "The C LDAP Application Program Interface," Draft-RFC (draft-ietf-ldapext-ldap-c-api-04.txt).

Locator service 304, event services 306, and extension libraries 308 do not implement standard elements of the LDAP protocol. They implement functions that are new to embodiments of the invention.

Locator service 304 provides a scalable mechanism whereby the directory enabling element 312 can locate the closest directory server in a network. In one exemplary embodiment, directory-enabled network element is implemented in the position of DRP Agent 14B of FIG. 1B. Locator service 304 cooperates with distribution direction element 16 to locate network elements in the network.

In one embodiment, Locator service 304 includes a domain controller API that can return the name of a Domain Controller (DC) in a specified domain. The domain may be trusted (directly or indirectly) or untrusted by the caller. Criteria for selecting a domain controller is supplied to the API to indicate preference for a DC with particular characteristics. Preferably, the domain controller API does not require any particular access to the specified domain, and by default, does not ensure the returned domain controller is currently available. Rather, the caller attempts to use the returned domain controller. If the domain controller is not available, the caller repeats the call and includes an explicit request that the API carry out re-discovery of the domain controller.

In the preferred embodiment, the domain controller API accepts the following parameters: ComputerName, DomainName, DomainGuid, SiteName, Flags, and DomainControllerInfo. The ComputerName parameter specifies the name of the server to remote this API to. Typically, this parameter has a NULL value. The DomainName parameter indicates the name of the domain to query and can either be a DNS-style name (e.g., cisco.com.) or a flat-style name (e.g., cisco). If NULL is specified and a DS_GC_SERVER_REQUIRED flag is specified, the tree name of the primary domain of localhost is used. If NULL is specified and the DS_GC_SERVER_REQUIRED flag is not specified, the domain name of the primary domain of localhost is used.

The DomainGuid value specifies the Domain GUID of the domain being queried. This value is used to handle the case of domain renames. If this value is specified and DomainName has been renamed, the domain controller API will attempt to locate a DC in the domain having this specified DomainGuid.

The SiteName value specifies the name of the site the returned DC should be "close" to. The parameter should typically be the name of the site the client is in. If not specified, the SiteName defaults to the site of ComputerName.

The Flags value passes additional information to be used to process the request. Flags can be a combination of one or more of the following values.

DS_FORCE_REDISCOVERY—Requires that the "closest" Domain Controller be determined again even though one is currently known in cache. This flag can be used in the case that an additional Domain Controller comes available or where a Domain Controller has been detected to be unavailable. The returned Domain Controller is verified to be running if this flag is specified. Without this flag, this API will only guarantee that the returned DC when the DC was initially entered into the cache.

DS_DIRECTORY_SERVICE_REQUIRED—Indicates that the returned DC must provide directory services.

DS_DIRECTORY_SERVICE_PREFERRED—Indicates that the returned DC should provide directory services. If no such DC is available, a prior version DC will returned. If no DC supporting a directory service is available, the API will return the name of the "closest" DC that does not have directory service. However, the API will only return the non-directory DC information after the attempt to find a DS DC has timed out.

DS_GC_SERVER_REQUIRED—Indicates that the returned DC must be a Global Catalog (GC) server for the tree of domains with this domain as the root. This flag may not be set if any of the following flags are set: DS_WRITABLE-REQUIRED, DS_FDC_REQUIRED or DS_PDC_REQUIRED. The DS_PDC_REQUIRED flag indicates that that the returned DC be the Primary Domain Controller for the domain. This flag may not be set if any of the following flags are set: DS_WRITABLE_REQUIRED, DS_FDC_REQUIRED or DS_GC_SERVER_REQUIRED. The DS_WRITABLE_REQUIRED flag indicates that the returned DC must host a writable copy of the DS (or SAM). If the specified DomainName is a flat name, this flag is the same as DS_PDC_REQUIRED. If the specified DomainName is a DNS name, this flag finds DCs that advertise themselves as writable. This flag may not be set if any of the following flags are set: DS_PDC_REQUIRED, DS_FDC_REQUIRED or DS_GC_SERVER_REQUIRED.

The flag DS_FDC_REQUIRED indicates that the returned DC must be the Floating Domain Controller for the domain. In a mixed domain that uses Windows NT servers, certain servers may plays the special role of replicating account changes. That DC is called the "Floating" DC since the function "floats" to another NT server automatically if the current floating DC becomes unavailable. This flag may not be set if any of the following flags are set: DS_PDC_REQUIRED, DS_WRITABLE_REQUIRED or DS_GC_SERVER_REQUIRED.)

The DS_IP_REQUIRED flag indicates that the IP address of the discovered DC must be returned in the DomainControllerAddress field. The DS_KDC_REQUIRED flag indicates that the returned DC must be currently running the Kerberos Key Distribution Center Service. The DS_TIMESERV_REQUIRED flag indicates that the returned DC be currently running the Windows Time Service. The DS_IS_FLAT_NAME flag indicates that the DomainName parameter is a flat name. As such, the Section will not be attempted. This flag may not be specified with the DS_IS_DNS_NAME flag.

The DS_IS_DNS_NAME flag indicates that the DomainName parameter is a DNS name. This flag may not be specified with the DS_IS_FLAT_NAME flag.

The DomainControllerInfo parameter returns a pointer to a data structure ("DOMAIN_CONTROLLER_INFO") describing the domain controller selected.

In the preferred embodiment, the API may return an error code if an error occurs. For example, a code of NO_ERROR indicates that the requested operation completed successfully. An ERROR_NO_SUCH_DOMAIN code indicates that no DC is available for the specified domain or the domain does not exist. An ERROR_INVALID_DOMAINNAME code indicates that the format of the specified DomainName is invalid. An ERROR_INVALID_COMPUTERNAME code indicates that the format of the specified ComputerName is invalid. An ERROR_INVALID_FLAGS code indicates that the Flags parameter has conflicting or superfluous bits set. Other error codes may be provided.

In one embodiment, the DOMAIN_CONTROLLER_INFO structure comprises values that represent the computer name of the discovered domain controller; the address of the discovered domain controller; the type of address; an IP address value for the domain controller; the domain name of the domain; the domain name of the domain at the root of the directory services tree; flags describing the domain controller; the name of the site the Domain Controller is in; and the name of the site ComputerName is in.

Event services 306 provides a mechanism for one or more directory clients to register to their servers events that are of interest to the directory clients. When the event occurs, the directory server notifies all subscribed clients so that the clients can take appropriate actions.

Extension libraries 308 are optional. In one embodiment, extension libraries 308 are data libraries and executable library routines that map device-specific schema information to generic octet string values, and vice versa.

In the preferred embodiment of FIG. 3A, which is shown by way of example, directory enabling element 312 comprises bind service 314 and startup services 318. Optionally, directory enabling element 312 comprises Unicode service 316, however, it is not required.

Startup services 318 carry out initialization of global variables that all the components of directory enabling element 312 use. In an embodiment, startup services 318 may require that the directory enabled element 300 has obtained a Kerberos TGT and session key from a KDC before applications 310 start.

Functions of bind service 314 include initiating a protocol session between a client and a server, and allowing the authentication of the client to the server. A bind operation normally is the first operation request received by a server from a client in a protocol session.

An application connects to a directory server by issuing a bind request message, which is received by directory-enabled network element 300. In response, directory-enabled network element 300 opens a socket and a TCP connection is established between the application as client and the directory server. The application can then issue other requests and carry out other operations using the socket. When another application needs to issue an LDAP request, including a request to the same server, the application issues a bind request message. In response, directory-enabled network element 300 opens another socket and establishes a separate TCP connection for the second application.

Unicode service 316 enables directory-enabled network element to exchange directory information that is encoded in Unicode format or UTF-8 format. Unicode is a 16-bit character encoding standard, defined in ISO standard 10646, that includes most characters used in general text interchange throughout the world. Such 16-bit characters, however, are not compatible with many current applications and protocols. Accordingly, Unicode standard transformation formats (UTFs) have been developed.

UTF-8 is a preferred UCS transformation format that preserves the full range of United States ASCII characters. In UTF-8 encoding, a string of bytes represent a 16-bit string. ASCII text in the range (<=U+007F) is expressed unchanged as a single byte, values (U+0080–007FF) including Latin, Greek, Cyrillic, Hebrew, and Arabic characters are converted to a 2-byte sequence, and values (U+0800–FFFF) (Chinese, Japanese, Korean, and others) are encoded as a 3-byte sequence.

LDAP version 3 supports international character sets using UTF-8 encoding. In an LDAP version 3 directory service, such as Active Directory, object names and certain string attributes can contain non-ASCII characters. Some applications 310 and services may need to understand the content of such objects or manipulate their values. If an application 310 passes a Unicode string to a standard library that is expecting an ASCII character, the library may malfunction or generate errors. Accordingly, Unicode service 316 comprises functions that an application 310 can call using application program interface 302 in order to carry out appropriate conversion.

In one preferred embodiment, Unicode service 316 comprises string functions that: return the length of the first character of a UTF-8 string (value 1, 2, or 3); compare two UTF-8 encoded strings, ignoring case; return the number of characters in a string; return a pointer to the next character immediately before or after a particular string position. Other functions may be provided.

Figure 3B:
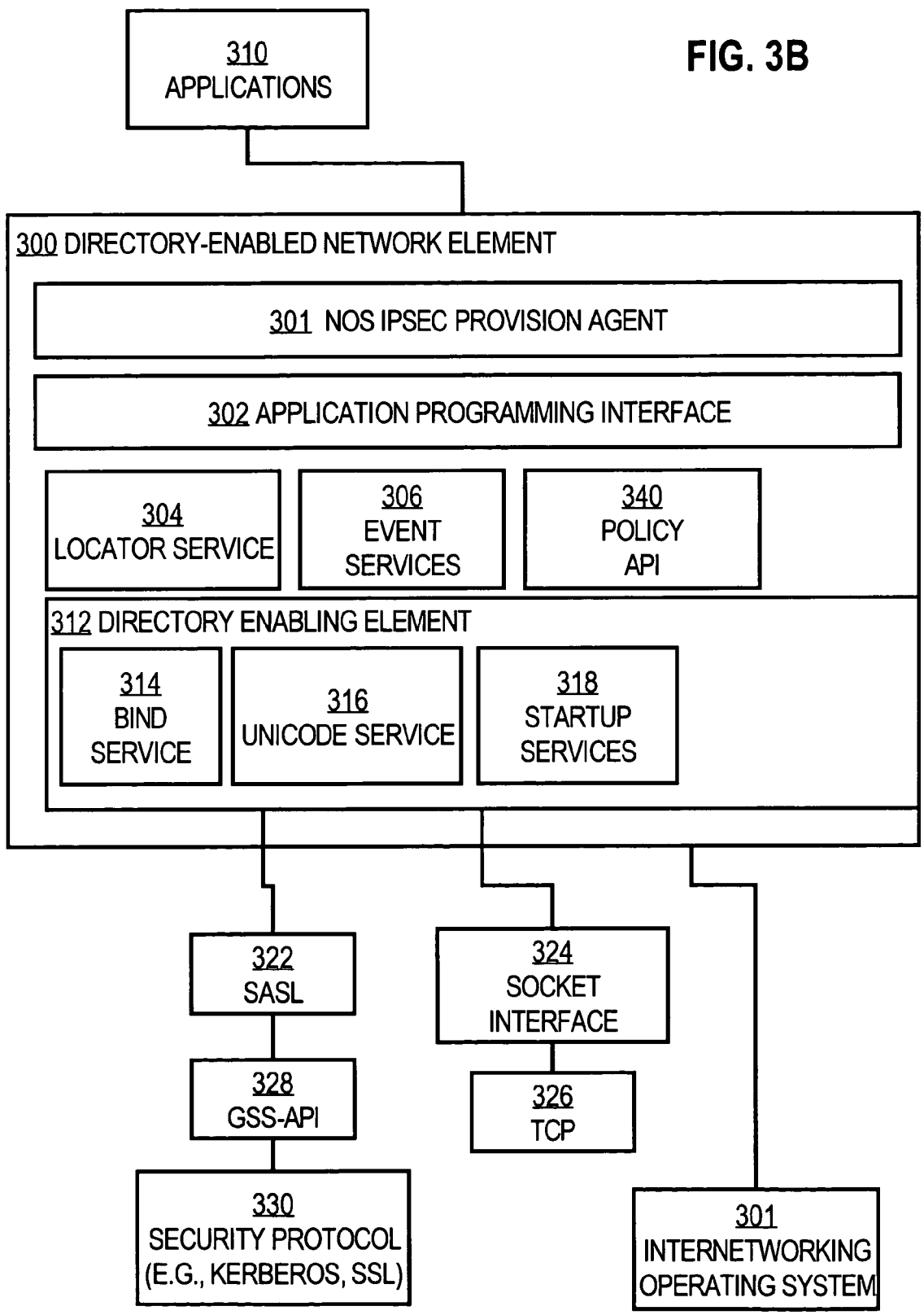
FIG. 3B is a block diagram of a directory-enabled network element and associated elements with which it may be used.

FIG. 3B is a block diagram of an alternate embodiment of a directory-enabled network element 300 and supporting elements with which it may be used. Generally, directory-enabled network element 300 comprises the elements shown in FIG. 3A and described above. Directory-enabled network element 300 further comprises NOS IPSEC Provision Agent 301, which is located logically above API 302. NOS IPSEC Provision Agent 301 uses locator service 304, event services 306, and policy API 340, which is described further herein, for the purpose of setting up IPSEC provisioning in network elements as described further herein. Additionally, directory-enabled network element 300 comprises policy API 340, the functions of which enable definition of centralized policies that are applied to groups of objects using the other elements of directory-enabled network element 300. Functions in policy API 340 can retrieve a policy handle, release a policy handle, retrieve IPSEC policy information, and free up IPSEC policy information. A complementary CNS policy resolver service can impersonate a client of IOS 301 to retrieve and send back policy information from directory services that are requested by the IOS client through the group policy API 340.

Figure 3C:
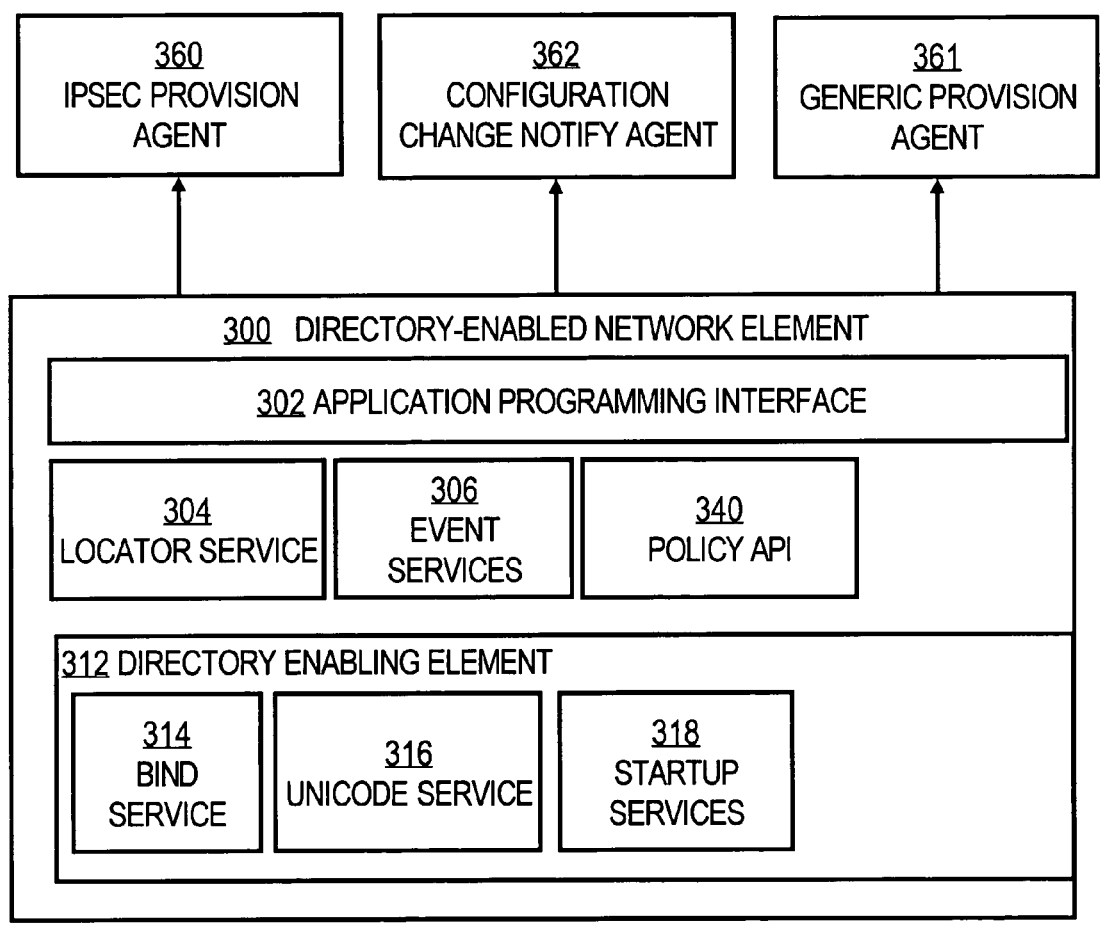
FIG. 3C is a block diagram of a directory-enabled network element and associated elements with which it may be used.

As shown in FIG. 3C, applications 310 may comprise, for example, IPSEC provision agent 360, configuration change notify agent 362, and generic provision agent 361.

IPSEC provision agent 360 is one example of a policy client application. It uses policy API 340 to communicate IPSEC policy information and configuration information between a directory service and a network element or IOS device. The IPSEC provision agent 360 uses policy API 340 to access a group policy Resolver Service.

Functions of the IPSEC provision agent 360 include initiating retrieving the IPSEC schema from Active Directory and integrating these policy data into a set of values ready to be applied onto a set of internal data structures of IPSEC software component of NOS. Thus, IPSEC provision agent 360 may be used to convert policy information received from Directory into a valid router configuration. Preferably, configuration information received using this mechanism is dynamic and is not stored as part of the non-volatile configuration of the router in NVRAM.

When a router or other device containing the IPSEC provision agent 360 is turned on, the IPSEC provision agent 360, if enabled, will request policy information from the policy API 340. At this time, there may or may not be local IPSEC policies in effect. The IPSEC provision agent 360 does not pass information to the policy API 340, but assumes that the locator service 340 is used to locate and connect to the correct Active Directory server.

If the Directory service is available, requested IPSEC policy information is returned to the IPSEC provision agent 360. This new IPSEC policy information is checked to ensure all the required information is present. If it is not, the new IPSEC policy will be ignored and an error is logged using an error logging mechanism of the NOS. If the new IPSEC policy information is complete, then IPSEC provision agent 360 invalidates any prior IPSEC policy information, and informs a local IPSEC agent of directory-enabled network element 300 of its new configuration, by translating the policies into appropriate values to be used by IPSEC API calls to update a set of IPSEC internal data structures. In an alternate embodiment, the policy information is locally cached.

Any local interface to IPSEC present in the device, such as a router console port, may modify or disable the policy information in the normal manner.

Preferably, IPSEC provision agent 360 periodically polls for IPSEC Policy information based on a refresh time received as part of the data from the Resolver service.

Generic Provision Agent 361 provides a generic, secured and reliable way to deliver CLI commands to the running configuration of an IOS device. In operation, upon retrieving event data comprising a set of CLI commands, the Provision Agent parses each command to ensure it is syntactically correct, and then applies each command to the device. If a syntax error is found during the parsing step, the Provision Agent initiates an error event.] Configuration change notify agent 362 is one example of a provision agent and is also an example of a security application.

FUNCTIONAL EXAMPLE

Figure 4:
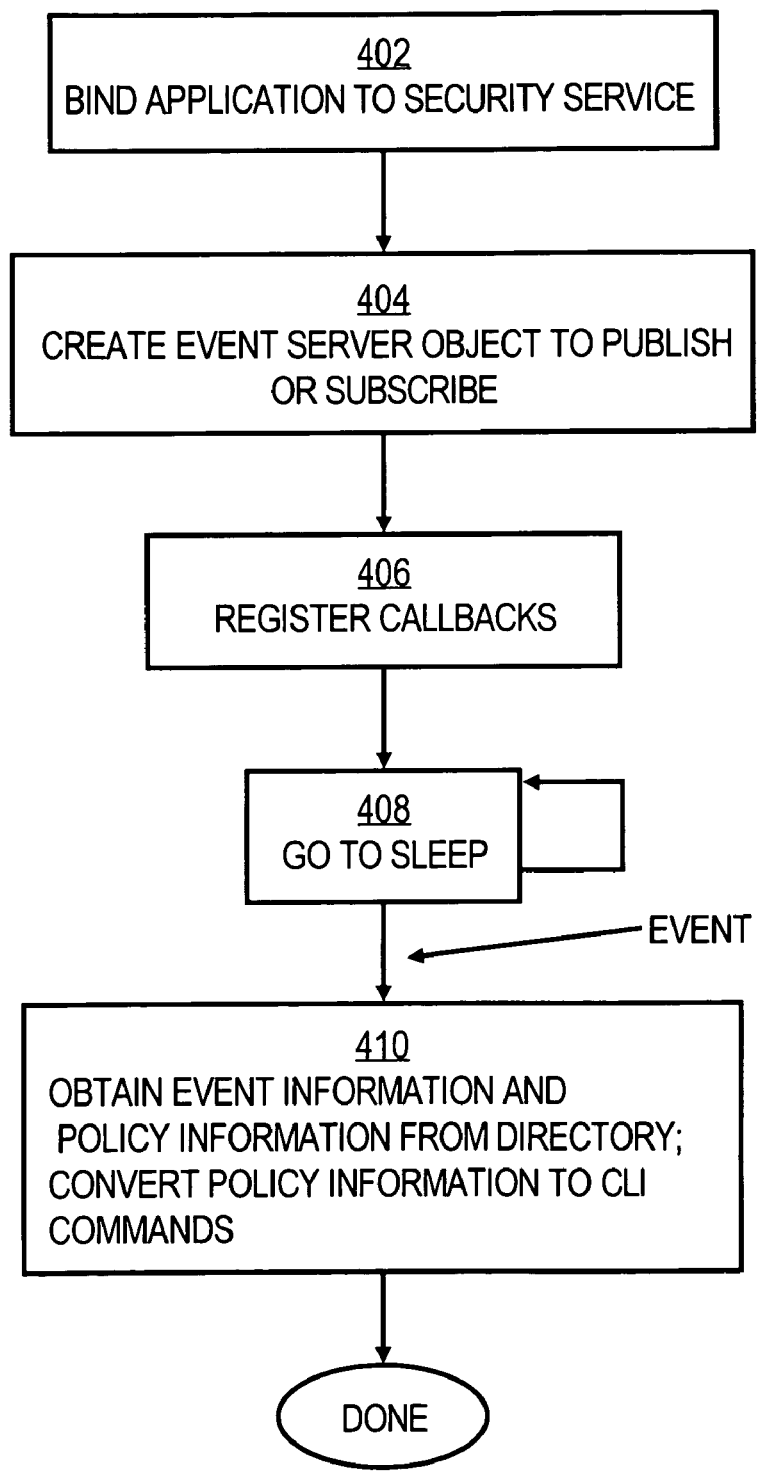
FIG. 4 is a flow diagram of a process of an application interacting with a directory-enabled network element.

FIG. 4 is a block diagram presenting a functional example of how an application can interact with a directory-enabled network element. The steps of FIG. 4 may be used, for example, by an application 310 to obtain information from a network directory service, such as Directory.

In block 402, the process binds the application to a security service. For example, application 310 uses locator service 304 to locate the nearest directory server, and then uses bind service 314 to carry out an LDAP SASL bind to that server. As a result, application 310 can use security protocol 330, e.g., Kerberos, to communicate with the directory-enabled network element. The application 310 can then automatically authenticate itself to the directory. Block 402 also may involve fetching the location of the event server from an associated event schema, and securely binding to that event server.

In block 404, the process creates an event server object to publish or subscribe events. Thus, block 404 involves registering desired events with the event server. In block 406, the process registers a series of callbacks that describe what needs to be done when specified events occur. In block 408, the process becomes inactive ("sleeps") until a specified event occurs. The nature of the events will vary according to the nature of application 310. For example, when application 310 is an IPSEC application, events may include changing the algorithm to be used by the IPSEC kernel, or making any change to IPSEC policy provisioning ("IPSEC policy provisioning update").

When an event occurs, as indicated by block 410, the process obtains event information including policy information by using the group policy API 340 to query policy information from a directory server based on the directory schema. The received policy information is converted or mapped to router CLI commands using the IPSEC provision agent 360. For example, the policy information is translated into a set of values that are ready to apply to a set of internal data structures of the IPSEC software component of a router, by calling one or more internal NOS API functions. When the calls are executed, a dynamic IPSEC configuration is created. Thus, a virtual private network or IPSEC is created between either two routers, or between a remote client and its remote gateway router.

As a result, a network element can automatically authenticate itself to a directory service, and can obtain, use, and update directory services information without reliance on external programs or mechanisms.

HARDWARE OVERVIEW

Figure 5:
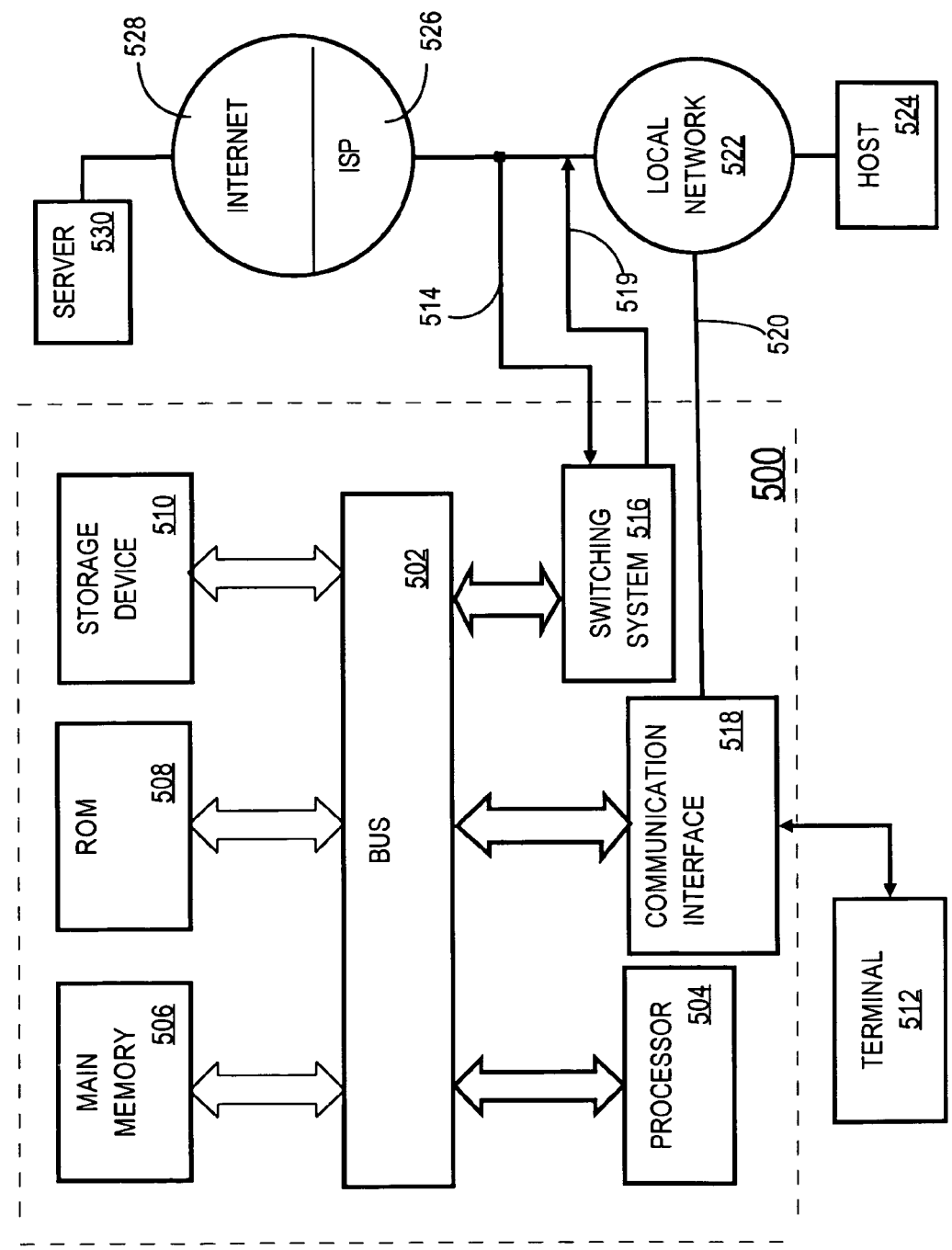
FIG. 5 is a block diagram of a computer system with which an embodiment may be used.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

An communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for the techniques and functions described herein in a network system. According to one embodiment of the invention, such techniques and functions are provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media, volatile storage media, and transmission media. Non-volatile storage media includes, for example, optical or magnetic disks, such as storage device 510. Volatile storage media includes dynamic memory, such as main memory 506. Transmission media includes coaxial cables, copper wire and fiber optics, including the wires that comprise bus 502.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for the techniques and functions that are described herein.

The received code may be executed by processor 504 as it is received, and/or stored in storage device 510, or other non-volatile storage for later execution. In this manner, computer system 500 may obtain application code in the form of a carrier wave.

ADVANTAGES AND SCOPE

Directory-enabled network elements have been disclosed. Advantageously, directory-enabled network elements may be used, for example, by Internet Service Providers (ISPs) to offer comprehensive, flexible, and competitive network services to their customers. Directory-enabled network elements also solve the scalability problems involved in configuring and provisioning network services. Manual provisioning is substantially eliminated. Also advantageously, directory-enabled network elements integrate easily with directory services, including Active Directory.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus in a network element, wherein said network element is any one of a packet router and a data switch operable to manipulate packets at any of Open System Interconnection (OSI) Layer 2 and 3 in a network, the apparatus comprising:

a directory enabling element operable under control of an operating system of the network element, wherein the directory enabling element is configured to query, access, and update directory information that is managed by a directory service of the network that includes the network element, wherein the directory service is any one of a Lightweight Directory Access Protocol (LDAP) directory and an X.500 directory;

an application programming interface coupled to the directory enabling element and configured to receive directory services requests from application programs and provide the directory services requests to the directory enabling element, wherein the application programs are hosted in the network element;

a locator service coupled to the directory enabling element and accessible using the application programming interface and configured to enable the application programs to locate servers that provide the directory services in the network; and a bind service in the directory enabling element and coupled to a security protocol and configured to bind an external application program to the security protocol.

2. An apparatus as recited in claim 1, further comprising a Unicode translation service configured to query, access, and update directory information that is encoded in a Unicode international character format.

3. An apparatus in a network element, wherein said network element is any one of a packet router and a data switch operable to manipulate packets at any of Open System Interconnection (OSI) Layer 2 and 3 in a network, the apparatus comprising:

a directory enabling element operable under control of an operating system of the network element, wherein the directory enabling element is configured to query, access, and update directory information that is managed by a directory service of the network that includes the network element, wherein the directory service is any one of a Lightweight Directory Access Protocol (LDAP) directory and an X.500 directory;

an application programming interface coupled to the directory enabling element and configured to receive directory services requests from application programs and provide the directory services requests to the directory enabling element, wherein the application programs are hosted in the network element;

a locator service coupled to the directory enabling element and accessible using the application programming interface and configured to enable the application programs to locate servers that provide the directory services in the network; and an event service coupled to the directory enabling element and configured to receive registration of an event and an associated responsive action from an application program, notify the application program when the event occurs, and execute the associated responsive action in response thereto.

4. An apparatus as recited in claim 1, further comprising a group policy interface coupled to the directory enabling element and configured to receive and update the directory service with one or more definitions of directory services policies that apply to groups of network devices in the network.

5. An apparatus as recited in claim 1, further comprising an event service coupled to the directory enabling element and accessible using the application programming interface and configured to receive registration of an event and an associated responsive action from an application program, notify the application program when the event occurs, and execute the associated responsive action in response thereto.

6. An apparatus in a packet router, wherein said packet router is operable to manipulate packets at any of Open System Interconnection (OSI) Layer 2 and 3 in a packet-switched network, the apparatus comprising:
- a directory enabling element operable under control of an operating system of the packet router, wherein the directory enabling element is configured to query, access, and update directory information that is managed by a directory service of the packet-switched network, wherein the directory service is any one of a Lightweight Directory Access Protocol (LDAP) directory and an X.500 directory;
- a bind service in the directory enabling element and coupled to a security protocol and configured to bind an application program to the security protocol; and
- an event service coupled to the directory enabling element and accessible using the application programming interface and configured to receive registration of an event and an associated responsive action from an application program, notify the application program when the event occurs, and execute the associated responsive action in response thereto.

7. An apparatus in a data switch, wherein said data switch is operable to manipulate packets at any of Open System Interconnection (OSI) Layer 2 and 3 in a packet-switched network, the apparatus comprising:
- a directory enabling element operable under control of an operating system of the data switch, wherein the directory enabling element is configured to query, access, and update directory information that is managed by a directory service of the packet-switched network, wherein the directory service is any one of a Lightweight Directory Access Protocol (LDAP) directory and an X.500 directory;
- a bind service in the directory enabling element and coupled to a security protocol and configured to bind an application program to the security protocol; and
- an event service coupled to the directory enabling element and accessible using the application programming interface and configured to receive registration of an event and an associated responsive action from an application program, notify the application program when the event occurs, and execute the associated responsive action in response thereto.

8. A computer-readable tangible storage medium storing one or more sequences of instructions for a network element, wherein said network element is any one of a packet router and a data switch operable to manipulate packets at any of Open System Interconnection (OSI) Layer 2 and 3 in a network, wherein execution of the one or more sequences of instructions by one or more processors of the network element causes the one or more processors to perform the steps of:
- creating and storing a directory enabling element operable under control of an operating system of the network element, wherein the directory enabling element is configured to query, access, and update directory information that is managed by a directory service of the network that includes the network element, wherein the directory service is any one of a Lightweight Directory Access Protocol (LDAP) directory and an X.500 directory;
- binding an application program to a security protocol;
- creating an event and an associated responsive action that are associated with the application program; and
- in response to occurrence of the event, executing the responsive action, obtaining policy information from the directory service, and converting the policy information into one or more commands that are executable by the network element.

9. A computer-readable tangible storage medium as recited in claim 8, wherein execution of the one or more sequences of instructions by one or more processors causes the one or more processors to perform the further steps of:
- locating a nearest directory server and binding the application program to the nearest directory server that is located;
- locating a nearest event server and binding the application program to the nearest event server that is located.

10. A computer-readable tangible storage medium as recited in claim 8, wherein execution of the one or more sequences of instructions by one or more processors causes the one or more processors to perform the further steps of:
- translating the policy information into one or more values that are ready to apply to a router, whereby a virtual private network is created between the router and another network device.

11. A computer-readable tangible storage medium as recited in claim 8, wherein execution of the one or more sequences of instructions by one or more processors causes the one or more processors to perform the further steps of:
- translating the policy information into one or more values that are ready to apply to a set of internal data structures of a router, by calling one or more internal NOS API functions, whereby a dynamic IPSEC configuration is created that connects the router and at least one other network device.

12. A computer-readable tangible storage medium as recited in claim 8, wherein execution of the one or more sequences of instructions by one or more processors causes the one or more processors to perform the further steps of establishing an application programming interface coupled to the directory enabling element and configured to receive directory services requests from application programs and provide the directory services requests to the one or more processors.

13. A system comprising a network element enabled to automatically interface with directory services in a network, wherein the network element is any one of a packet router and a data packet switch operable to manipulate packets at any of Open System Interconnection (OSI) Layer 2 and 3 in the network, wherein the network element comprises:
- a directory enabling element operable under control of an operating system of the network element, wherein the directory enabling element is configured to query, access, and update directory information that is managed by directory services of the network that includes the network element, wherein the directory services include at least one of a Lightweight Directory Access Protocol (LDAP) directory and an X.500 directory; and
- a locator service coupled to the directory enabling element and configured to locate servers that provide the directory services in the network;
- wherein the network element obtains policy information from the directory services and updates the directory service.

14. The system of claim 13, wherein the network element includes a protocol agent for interfacing with the directory services.

* * * * *